United States Patent
Crombez et al.

(10) Patent No.: US 6,655,754 B2
(45) Date of Patent: Dec. 2, 2003

(54) VEHICLE BRAKE SYSTEM HAVING ADAPTIVE TORQUE CONTROL

(75) Inventors: Dale Scott Crombez, Livonia, MI (US); John Patrick Joyce, Grosse Pointe Park, MI (US); Patrick J. Curran, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 10/063,241

(22) Filed: Apr. 2, 2002

(65) Prior Publication Data

US 2003/0184155 A1 Oct. 2, 2003

(51) Int. Cl.[7] ................................................ B60T 8/64
(52) U.S. Cl. .................. 303/152; 303/20; 303/112; 303/3; 303/155; 303/177; 188/156
(58) Field of Search ................... 303/152, 3, 112, 303/155, 20, 13–15, 177, 178, 199, 122.04, 122.09; 188/156, 158, 181 T; 180/165, 65.1; 701/22

(56) References Cited

U.S. PATENT DOCUMENTS

| | | | |
|---|---|---|---|
| 4,962,969 A | 10/1990 | Davis | 303/3 |
| 5,358,317 A | 10/1994 | Cikanek | 303/100 |
| 5,511,859 A | 4/1996 | Kade et al. | 303/3 |
| 5,615,933 A | 4/1997 | Kidston et al. | 303/152 |
| 5,716,108 A | 2/1998 | Asa et al. | 303/3 |
| 5,839,800 A | 11/1998 | Koga et al. | 303/152 |
| 5,997,107 A | 12/1999 | Koga et al. | 303/152 |
| 6,070,953 A | 6/2000 | Miyago | 303/152 |
| 6,086,166 A | 7/2000 | Fukasawa | 303/152 |
| 6,142,586 A | 11/2000 | Sakai | 303/152 |
| 2003/0080614 A1 * | 5/2003 | Soga | 303/152 |

* cited by examiner

*Primary Examiner*—Douglas C. Butler
(74) *Attorney, Agent, or Firm*—Gregory P. Brown (57) ABSTRACT

A vehicle brake systems (10) is provided which compensates for brake pedal feel variation to provide enhanced braking feel. The brake system (10) includes a brake pedal (18), a wheel sensor (20), and a database (16) for storing target accelerations and torque to pressure parameters. The brake systems (10) may employ a friction brakes (26) and regenerative brakes (29). The brake system further includes a controllers (12) for controlling the amount of braking, including the friction brake actuator (24). The controller (12) determines brake acceleration caused by braking torque and determines a target acceleration based on the driver commanded input. The controller (12) also determines a brake acceleration error as the difference between the target acceleration and the brake acceleration. The controller adjusts the torque-related parameter to reduce the brake acceleration error by adjusting the braking torque generated by the friction brake actuator to compensate for brake torque variation.

20 Claims, 7 Drawing Sheets

VEHICLE BRAKE SYSTEM HAVING ADAPTIVE TORQUE CONTROL

BACKGROUND OF INVENTION

The present invention generally relates to vehicle braking and, more particularly, to an adaptive brake control system that compensates for braking variations to provide consistent brake pedal feel to the vehicle operator.

Conventional friction braking systems installed on automobiles generally employ a brake pedal assembly having a brake pedal coupled to a master cylinder for providing pressurized hydraulic brake fluid to apply friction braking at the wheels of the vehicle. The brake pedal is actuated (depressed) by the vehicle operator to demand an amount of friction braking. Friction braking systems are generally configured to initially provide a consistent brake pedal feel to the vehicle operator such that the amount of friction braking achieved is substantially proportional to the amount of force applied to the brake pedal by the vehicle operator. However, it is generally known that a number of factors may lead to inconsistent brake pedal response. For example, wear on the friction brake pads, brake fade, variations from one brake pedal to another brake pedal in different vehicles, and temperature can influence the brake pedal response, and thus may provide inconsistent friction braking over time. As a consequence, the vehicle operator may experience inconsistent variations in brake pedal feel.

The inconsistent brake pedal response generally experienced with friction braking can become more significant when combined with regenerative braking, commonly found on electric and hybrid vehicles. Regenerative braking systems are typically combined with friction braking systems to convert kinetic energy to electrical energy for storage in the vehicle battery. Regenerative braking is typically powered by an electric motor, which acts as a generator during braking, coupled to the powertrain to convert the kinetic energy to electrical energy. Regenerative braking may also be performed with energy storage technologies that convert the kinetic energy of a vehicle into an alternate form of energy. Concepts exist for recovering vehicle kinetic energy and storing it in the form of pressurized hydraulic fluid, rotating flywheels, and magnetic fields maintained by super conducting coils. The proportional amounts of regenerative braking and friction braking is typically determined by the brake control system, and generally varies depending on a number of factors including vehicle speed, battery charge, and the amount of braking force commanded. As the vehicle brake control system changes the proportional amounts of regenerative braking and friction braking, the inconsistent brake pedal response becomes more significant, since under certain circumstances the proportional amounts of friction and regenerative braking may change quickly, resulting in inconsistent brake pedal response. Thus, the resultant inconsistent brake pedal feel becomes more noticeable to the vehicle operator.

Accordingly, it is desirable to provide for a brake control system in a vehicle that adapts and compensates for inconsistent brake pedal response in friction braking systems. Additionally, it is desirable to provide for a vehicle brake pedal control system for controlling both friction braking and regenerative braking, which compensates for inconsistent brake pedal response experienced in the vehicle braking, so as to provide more consistent brake pedal feel to the vehicle operator.

SUMMARY OF INVENTION

In accordance with the teachings of the present invention, a vehicle brake system is provided which compensates for brake pedal feel variation so as to provide for enhanced braking feel to the vehicle operator. The brake system includes a brake command input indicative of braking demand requested by a vehicle operator, a friction brake actuator for generating braking force to be applied to one or more brakes on a vehicle, a sensor for sensing kinematic acceleration of the vehicle, and a database storing target accelerations as a function of the brake command input, and further storing a brake parameter that defines a relationship between the brake command input and the friction braking. The vehicle brake system further includes a controller for controlling the friction brake actuator based on the brake demand input and the brake parameter. The controller determines brake acceleration caused by the braking as a function of the sensed kinematic acceleration and determines a target acceleration from the database based on the brake demand input. The controller determines a brake acceleration error as the difference between the target acceleration and the brake acceleration. The controller further adjusts the parameter to reduce the brake acceleration error by adjusting the braking generated by the friction brake actuator so as to compensate for brake variation. According to one aspect of the present invention, the brake actuator includes friction braking and regenerative braking, wherein the amount of friction braking is adjusted to compensate for brake variation.

These and other features, advantages and objects of the present invention will be further understood and appreciated by those skilled in the art by reference to the following specification, claims and appended drawings.

BRIEF DESCRIPTION OF DRAWINGS

The present invention will now be described, by way of example, with reference to the accompanying drawings.

DETAILED DESCRIPTION

Figure 1:
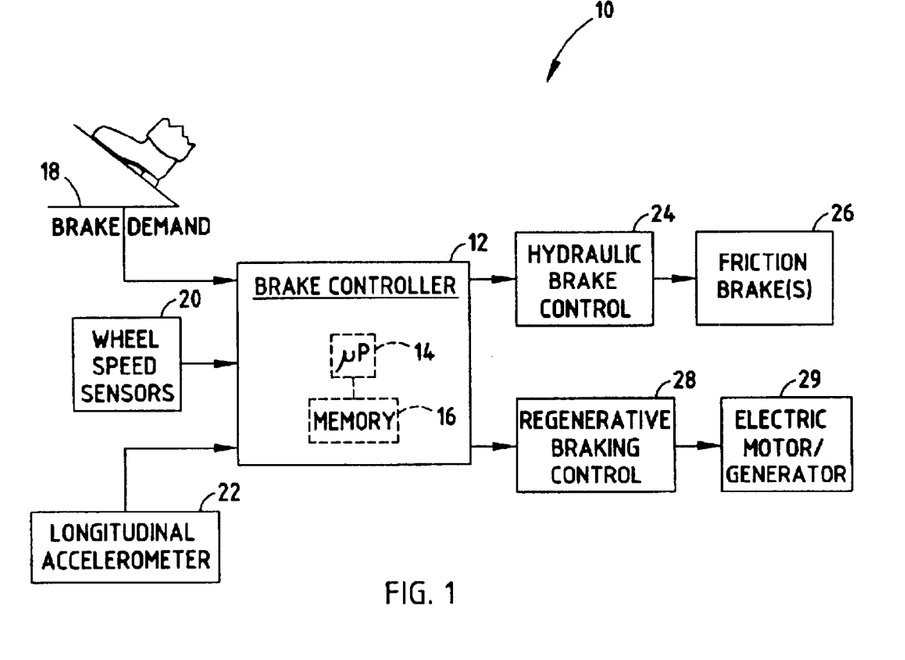
FIG. 1 is a block diagram illustrating a brake system for a vehicle.

Referring to FIG. 1, a brake system 10 is generally shown for an electric vehicle having regenerative braking and hydraulic friction braking. The brake system 10 according to the present invention employs controls to determine variation in the brake torque and compensate for such brake torque variation so as to provide for consistent braking feel to the vehicle operator. The brake system 10 is shown and described in connection with the combination of hydraulic friction braking and regenerative braking, typically employed in electric and hybrid vehicles. However, it should be appreciated that the adaptive torque control for compensating for brake torque variations according to the present invention may be employed for friction brake systems alone, or for the combination of friction braking and regenerative braking.

The brake system 10 includes a brake controller 12 for controlling the overall braking operation, including detecting variation in brake torque and compensating for such brake torque variation, according to the present invention. The brake controller 12 preferably includes a microprocessor 14 and memory 16 for storing and processing brake control routines, including one or more routines for detecting and compensating for inconsistent brake torque variation as described herein. The brake controller 12 may include one or more commercially available controllers capable of processing one or more brake control routines and storing data related thereto, as should be evident to those skilled in the art.

The brake controller 12 receives a brake demand signal from a brake pedal 14, speed signals from wheel speed sensors 20 associated with various vehicle wheels, and an acceleration signal from a longitudinal accelerometer 22. The brake pedal 18 is shown as a conventional foot pedal that is actuated by the operator (driver) of the vehicle to demand an amount of braking torque based on the driver applied force. The brake demand signal may include a sensed pressure, typically generated in a master cylinder, and/or a pedal stroke travel distance indicative of the travel distance of the brake pedal 18. The use of sensed pressure and/or distance is well-known in the vehicle braking art as indications of the amount of braking effort requested by the vehicle operator for controlling braking of a vehicle. The wheel speed sensors 20 may include conventional rotary speed sensors mounted in the vehicle wheels for measuring the rotational speed of each corresponding wheel. The longitudinal accelerometer 22 may include an inertial accelerometer oriented to measure acceleration of the vehicle along its longitudinal (i.e., rear-to-front) axis.

Also shown in the brake system 10 is a hydraulic brake control 24, which may include a conventional master cylinder for generating pressurized hydraulic brake fluid, as is commonly known in the vehicle brake art. The hydraulic brake control 24 communicates with friction brakes 26 to control the amount of friction braking. Friction brakes 26 are generally configured to provide friction braking to brake a corresponding wheel on the vehicle in response to the hydraulic fluid pressure generated by the hydraulic brake control 24. Each of friction brakes 26 may include conventional brake assemblies made up of calipers/cylinders and brake pads as is commonly known in the vehicle brake art. The hydraulic brake control 24 and friction brakes 26 may include other friction braking systems, such as electromechanical brake systems, which do not include hydraulics.

Further shown in the brake system 10 is a regenerative braking control 28 for controlling the regenerative braking of the vehicle. Regenerative braking control 28 controls the operation of an electric motor/generator 29, which is coupled to the vehicle powertrain (not shown) according to one embodiment. Regenerative braking systems are well-known for use in electric and hybrid vehicles for braking the vehicle via the electric motor/generator 29 and converting the kinetic energy during braking to electrical energy for storage in the vehicle battery (not shown). The electric motor/generator 29 thus operates as an electrical generator during the regenerative braking operation.

The brake controller 12 controls the proportional amounts of regenerative braking and friction braking. Generally, the proportional amount of regenerative braking depends on the amount of braking force commanded, the vehicle speed, battery charge, and other factors. In considering these factors, the brake controller 12 determines the proportional amount of friction braking and the proportional amount of regenerative braking to be applied during a given braking situation. The determined sum total of friction braking and regenerative braking should equal the total braking requested by the vehicle operator.

Figure 2A:
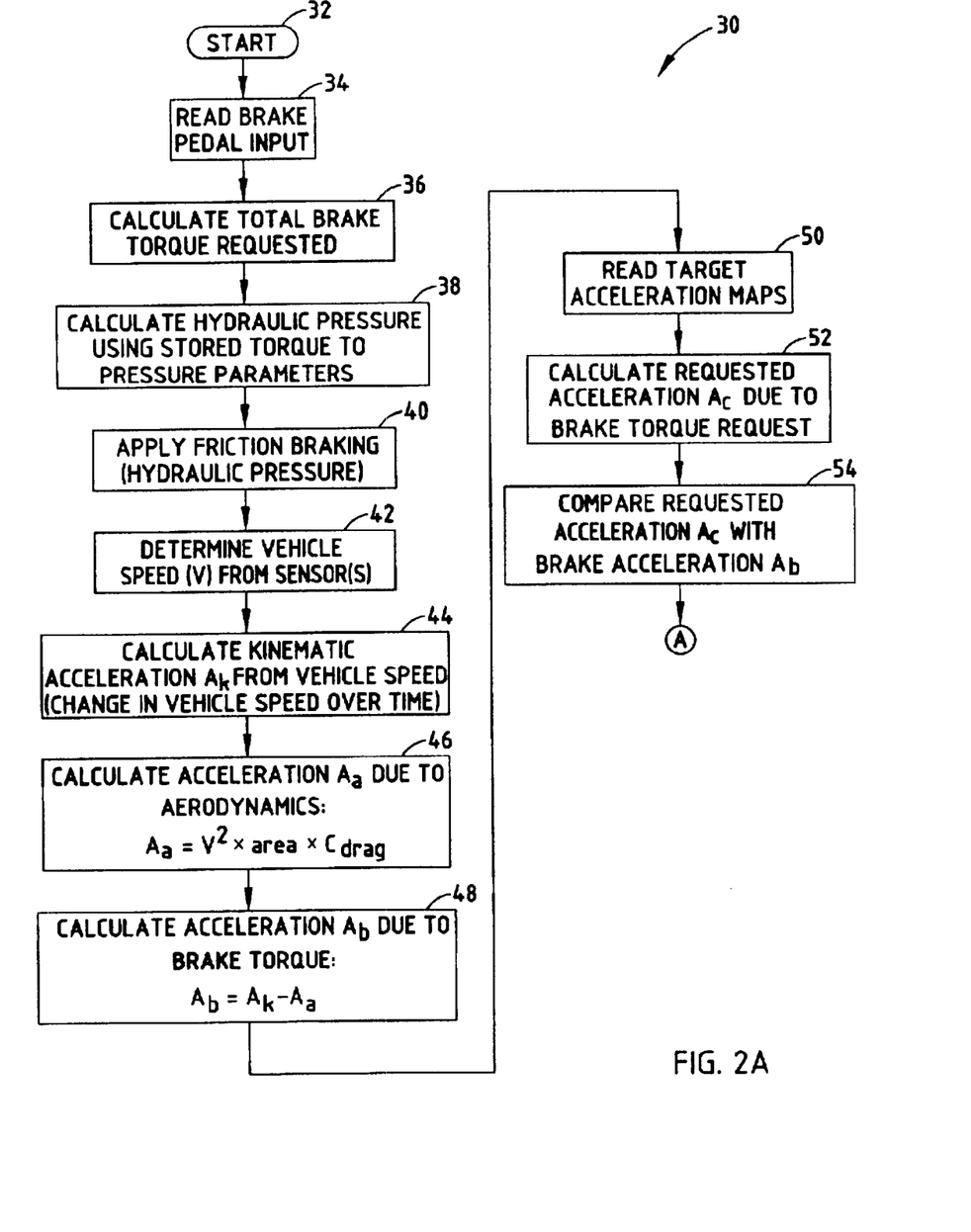
FIGS. 2A–2B is a flow diagram illustrating a method of adaptively controlling braking in a friction brake system, according to the present invention.
Figure 2B:
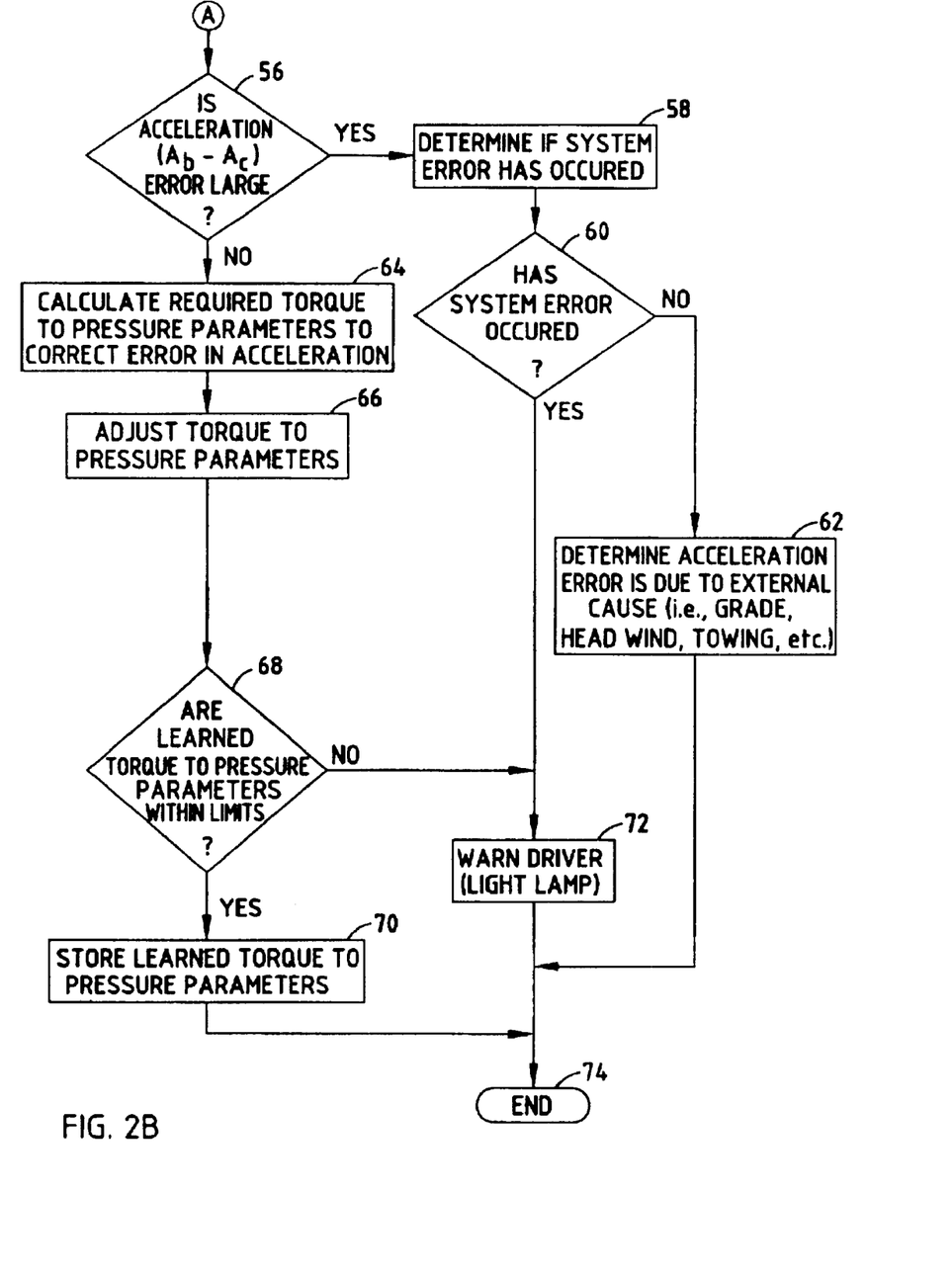

Referring to FIGS. 2A–2B, a brake control methodology 30 is shown for detecting brake torque variation and compensating for the detected variation to provide a more consistent vehicle braking feel in a vehicle equipped with friction braking (with no regenerative braking). Various disturbances can cause brake torque variations leading to inconsistent brake feel during braking, including changes in brake effectiveness, vehicle loading, head winds, grade, towing, etc. The influence of these factors can appear to a driver as random variations that are not consistently expected. The brake control methodology 30 helps to improve driver confidence, control, and comfort, and also helps prevent drivers from having to significantly alter their driving behavior when switching from one vehicle to another, by adjusting the friction braking so that the vehicle braking feel is consistent.

The brake control methodology 30 begins at step 32 and proceeds to read the brake pedal input in step 34, and to calculate the total brake torque requested from the driver commanded brake pedal input in step 36. The total brake torque requested is represented by a brake command signal indicative of the vehicle braking commanded by the vehicle operator. The total brake torque requested is typically obtained as a non-linear function of brake pedal force and/or brake pedal travel distance, as is well-known in the vehicle brake art. While the brake system is described herein in connection with controlling torque in a hydraulic brake system, it should be appreciated that other brake systems may be employed which control braking based on power or force, instead of torque.

The brake control methodology 30 proceeds to step 38 to calculate hydraulic brake fluid pressure using stored torque to pressure parameters to obtain the total brake torque requested. The torque to pressure parameters, which are routinely stored in memory, represent a functional relationship, which may be a multiplication factor, that provides an amount of hydraulic brake fluid pressure based on the brake torque requested. In step 40, friction braking is applied in response to the hydraulic brake fluid pressure as is commonly known in the vehicle brake art. In step 42, the control methodology 30 determines vehicle speed (V) from the vehicle wheel speed sensors, and calculates kinematic acceleration $A_k$ (change in vehicle speed over time) from the vehicle speed, in step 44. In step 46, the acceleration $A_a$ due to aerodynamics is calculated as a function of the vehicle speed squared ($V^2$) multiplied by the frontal area of the vehicle and a known vehicle coefficient of drag ($C_{drag}$). Next, in step 48, acceleration $A_b$ due to brake torque is calculated as a function of the aerodynamic acceleration $A_a$ subtracted from the kinematic acceleration $A_k$. The brake torque acceleration $A_b$ provides an approximate indication of the total vehicle acceleration due to the application of the vehicle brakes.

The brake control methodology 30 proceeds to step 50 to read target acceleration maps which are stored in memory. The target acceleration maps include mapped data that provide target accelerations corresponding to the various possible brake torque requests from the operator commanded brake pedal input. The acceleration map data is based on known vehicle characteristics and is stored in memory. Acceleration maps are commonly employed and, thus, are known in the vehicle brake art. Next, in step 52, the requested brake acceleration $A_c$ is calculated based on the calculated total brake torque requested by looking up the acceleration value in the target acceleration maps. The requested acceleration $A_c$ is then compared with the brake acceleration $A_b$ in step 54. The difference between the requested acceleration $A_c$ and the brake acceleration $A_b$ is the brake acceleration error. If the brake acceleration error ($A_b$–$A_c$) is large (i.e., greater than X), brake control methodology 30 proceeds to step 58 to determine if a system error has occurred. The system error determination checks for certain events which may cause a system error such that the measured data should be ignored. System error events may include a lack of producing sufficient brake torque on one of the vehicle wheels, such as may occur with a faulty brake valve, for example. When this occurs, the torque parameters are not adjusted and the measured data is ignored. Decision step 60 checks for whether such a system error determination has occurred and, if not, proceeds to step 62 to determine that the vehicle error is due to an external cause (i.e., grade, head wind, towing, etc.) which results in large unpredictable and/or rapidly changing errors in acceleration. Otherwise, if a system error has been determined, brake control methodology 30 ignores the measured data and proceeds to step 72 to provide a driver warning, such as lighting an indication light. If no system error has occurred, and the brake acceleration error is determined to be due to an external cause in step 62, brake control methodology 30 proceeds to end at step 74. When this occurs, the torque parameters are not adjusted and the measured data is ignored.

Returning to step 56, if the acceleration error is not large (i.e., not greater than X), methodology 30 proceeds to step 64 to calculate the required torque to pressure parameters to reduce (e.g., correct) the error in the brake acceleration. Calculating torque to pressure parameters required to correct for acceleration error results in calculating the parameters based on error in acceleration due to the friction brake error. This assumes and requires that the friction brake errors either do not change or change slowly over time. Next, in step 66, the torque to pressure parameters are then adjusted. Adjustment of the torque to pressure parameters may be made by adjusting the parameters based on the brake acceleration error, or adjusting the parameters based on stored data from previous stops (e.g., average correction from previous stops), or adjusting the parameters by a percentage difference in the brake acceleration error. Adjustment of the torque to pressure parameters based on the acceleration error will reduce the error to zero, whereas adjustment based on stored data from previous stops may more slowly reduce the error. If the torque to pressure parameters are adjusted by a percentage difference in the brake acceleration error, the parameters are incrementally adjusted until the error reaches zero, so as to provide a smooth adjustment of the brake torque variation.

In decision step 68, brake control methodology 30 checks whether the learned torque to pressure parameters are within predetermined torque to pressure limits and, if not, proceeds to step 72 to warn the driver. Otherwise, if the learned parameters are within the torque to pressure limits, the new torque to pressure parameters are stored in memory in step 70. The torque to pressure limits define a range within which it is acceptable to adjust the torque to pressure parameters. If the parameters are outside of this range, the brake control methodology 30 will not store the torque to pressure parameters. The torque to pressure limits advantageously serve to prevent braking adjustment if the adjustment becomes detrimental to the ability to stop the vehicle or makes the brake pedal feel too aggressive. Thereafter, brake control methodology 30 ends at step 74.

Figure 3A:
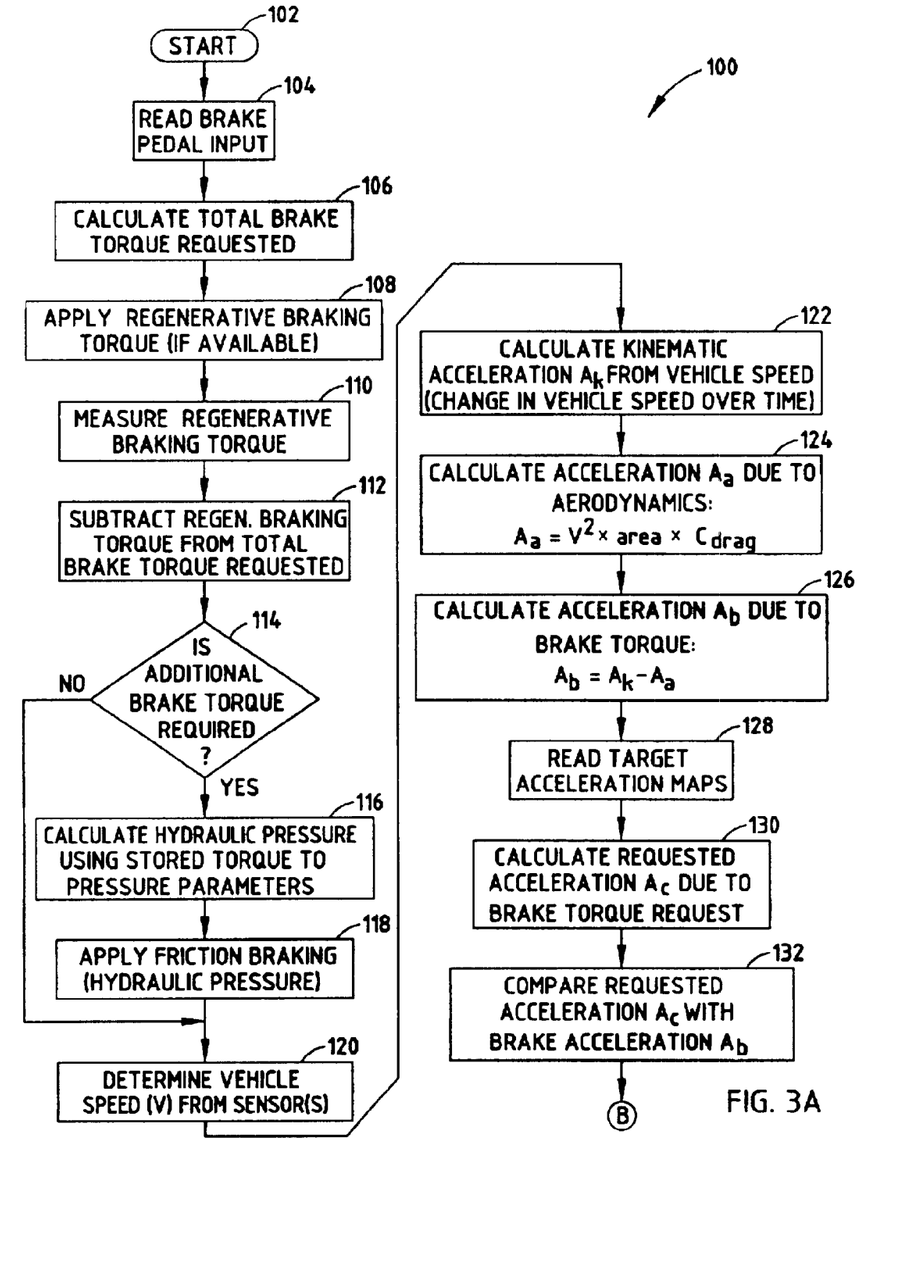
FIGS. 3A–3B is a flow diagram illustrating a method of adaptively controlling braking in a friction and regenerative brake system, according to one embodiment of the present invention.
Figure 3B:
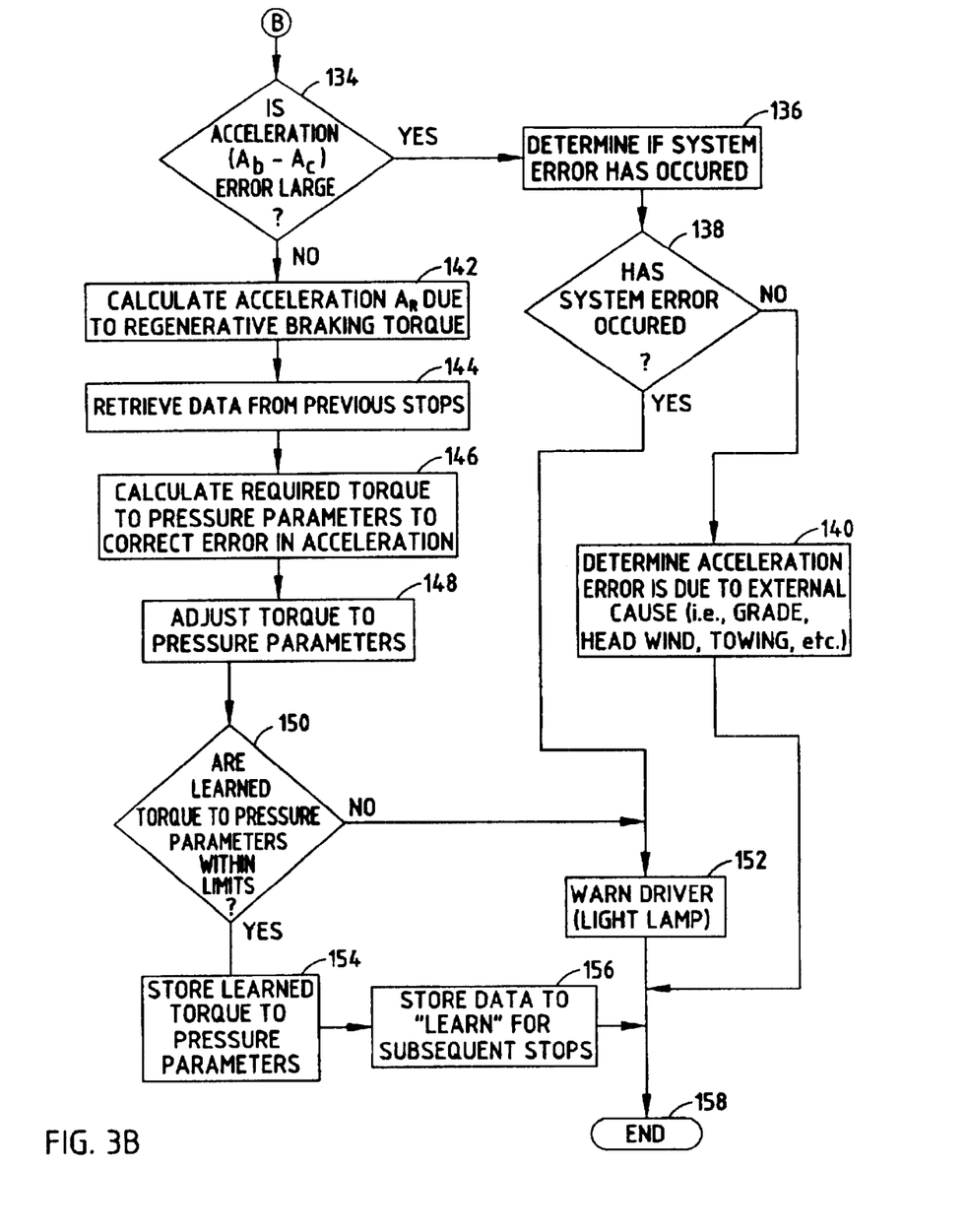

Referring to FIGS. 3A–3B, a brake control methodology 100 is shown for detecting brake torque variation and compensating for such variation to provide a more consistent vehicle braking feel for a vehicle equipped with both friction braking and regenerative braking. The brake control methodology 100 detects brake torque variations which may lead to inconsistent brake feel during vehicle braking, including changes in brake effectiveness, vehicle load, head winds, grade, towing, etc. The brake control methodology 100 helps to improve driver confidence, control, and comfort by providing consistent braking deceleration from one braking operation to another braking operation.

The brake control methodology 100 begins at step 102 and proceeds to read the brake pedal input in step 104, and then to calculate the total brake torque requested from the driver brake pedal input in step 106. The total brake torque requested is represented as a brake command signal indicative of the vehicle braking commanded by the vehicle operator. The total brake torque requested is typically obtained as a non-linear function of brake pedal force and/or brake pedal travel distance, as is well-known in the vehicle brake art.

The brake control methodology 100 proceeds to step 108 to apply regenerative braking torque, if regenerative braking is available. It should be appreciated that the regenerative braking torque may be available depending on certain conditions including the amount of brake torque requested, speed of the vehicle, the amount of energy stored in the battery, and other factors. In step 110, the regenerative braking torque is measured. The regenerative braking torque can be measured by measuring the voltage and current in the electric motor/generator and speed of the motor and the vehicle drive ratio (ratio between motor speed and wheel speed), to determine an approximate measurement of the regenerative braking torque. The regenerative braking torque could alternately be measured by a torque sensor coupled to the vehicle halfshaft or it may be implied or assumed that the regenerative torque requested is delivered. Brake control methodology 100 then proceeds to step 112 to subtract the measured regenerative braking torque from the total brake torque requested. Next, decision step 114 checks for whether additional brake torque, in addition to the regenerative braking torque, is required to achieve the total brake torque requested and, if so, calculates the hydraulic pressure for frictional braking using stored torque to pressure parameters, in step 116, and then applies friction braking based on the calculated hydraulic pressure, in step 118.

Proceeding to step 120, brake control methodology 100 determines the vehicle speed (V) based on the wheel speed sensors, and then calculates kinematic acceleration $A_k$ (change in vehicle speed over time) of the vehicle from the vehicle speed in step 122. In step 124, the acceleration $A_a$ due to aerodynamics is calculated as a function of the vehicle speed squared ($V^2$) multiplied by the frontal area of the vehicle and the coefficient of drag ($C_{drag}$). Next, in step 126, acceleration $A_b$ due to brake torque is calculated as a function of the aerodynamic acceleration $A_a$ subtracted from the kinematic acceleration $A_k$. The brake torque acceleration $A_b$ provides an approximate indication of the total vehicle acceleration caused by application of the vehicle brakes.

The brake control methodology 100 proceeds to step 128 to read target acceleration maps which are stored in memory. The target acceleration maps may be predetermined calibrations or may be adjusted by evaluating the vehicle acceleration due to regenerative braking. Braking torque with regenerative braking can be considered more accurate, therefore the acceleration from friction torque/pressure can be compared to the braking acceleration due to the regenerative braking. Next, in step 130, the requested brake acceleration due to the total brake torque requested is calculated based on the calculated total torque requested and the target acceleration maps. The requested acceleration $A_c$ is then compared with the brake acceleration $A_b$ in step 132. The difference between the requested acceleration $A_c$ and the brake acceleration $A_b$ is referred to as the brake acceleration error. If the brake acceleration error is large (i.e., greater than X) methodology 100 proceeds to step 136 to determine if a system error has occurred, as is described above. Decision step 138 checks for whether a system error determination has been made and, if not, proceeds to step 140 to determine if the vehicle error is due to an external cause (i.e., grade, head wind, towing, etc.) which results in large unpredictable and/or rapidly changing errors in acceleration. If a brake acceleration error is determined due to external cause, methodology 100 proceeds to end at step 158. When this occurs, the torque parameters are not adjusted and the measured data is ignored. Otherwise, if a system error is determined, methodology 100 proceeds to step 152 to provide a driver warning, such as lighting an indication light.

Returning to decision step 134, if the acceleration error is not large (i.e., not greater than X), brake control methodology 100 proceeds to step 142 to calculate brake acceleration $A_R$ due to regenerative braking torque. The brake acceleration $A_R$ is calculated based on regenerative braking torque and known characteristics of the vehicle, including vehicle weight. Next, in step 144, data is retrieved from the previous vehicle stops. In step 146, the required torque to pressure parameters are calculated to correct for the error in brake acceleration. Calculating torque to pressure parameters required to correct for brake acceleration error results in calculating the parameters based on error in acceleration due to friction brake error. If regenerative braking is present, the portion of total braking that is being produced by regenerative braking is considered. By comparing previous vehicle stop information and different levels of, or proportions of, regenerative and friction braking, the required torque to pressure parameters may be calculated such that the resulting friction torque output will match a potentially incorrect regenerative braking torque due to errors in regenerative braking torque (either measured or implied), and thus reducing stop-to-stop variability due to the differences in regenerative and friction torque errors. This assumes and requires that the regenerative and friction torque errors either do not change, or change slowly over time.

Next, in step 148, the torque to pressure parameters are adjusted. Adjustment of the torque to pressure parameters may be made by adjusting the parameters based on the brake acceleration error, or adjusting the parameters based on stored data from previous stops (e.g., average correction from previous stops), or adjusting the parameters by a percentage difference in the brake acceleration error, as described above. Decision step 150 checks whether the learned parameters are within predetermined torque to pressure limits and, if not, proceeds to step 152 to warn the driver. Otherwise, if the learned parameters are within the torque to pressure limits, the new torque to pressure limits are stored in memory in step 154. Thereafter, brake control methodology 100 stores data to learn for subsequent stops in step 156, before ending at step 158.

It should be appreciated that the brake control methodology 100 learns various information (data) acquired during subsequent vehicle stops when the brake torque generally is not changing. During dynamic stops when the vehicle pedal is moving, the acquired information is discarded. The stored data that is captured and saved may include the amount of braking torque requested, speed of the vehicle, the amounts of regenerative and frictional braking, and the amount of deceleration achieved, as well as other information. Thus, brake control methodology 100 provides consistent vehicle braking feel from one vehicle braking stop to another vehicle braking stop. It should be appreciated that other functions for modifying the brake torque command based on the brake acceleration error may be employed, without departing from the teachings of the present invention. The exact design or the function may employ any of the wide variety of approaches which are common in control system design, including, but not limited to integral control, proportional control, and derivative control.

Figure 4A:
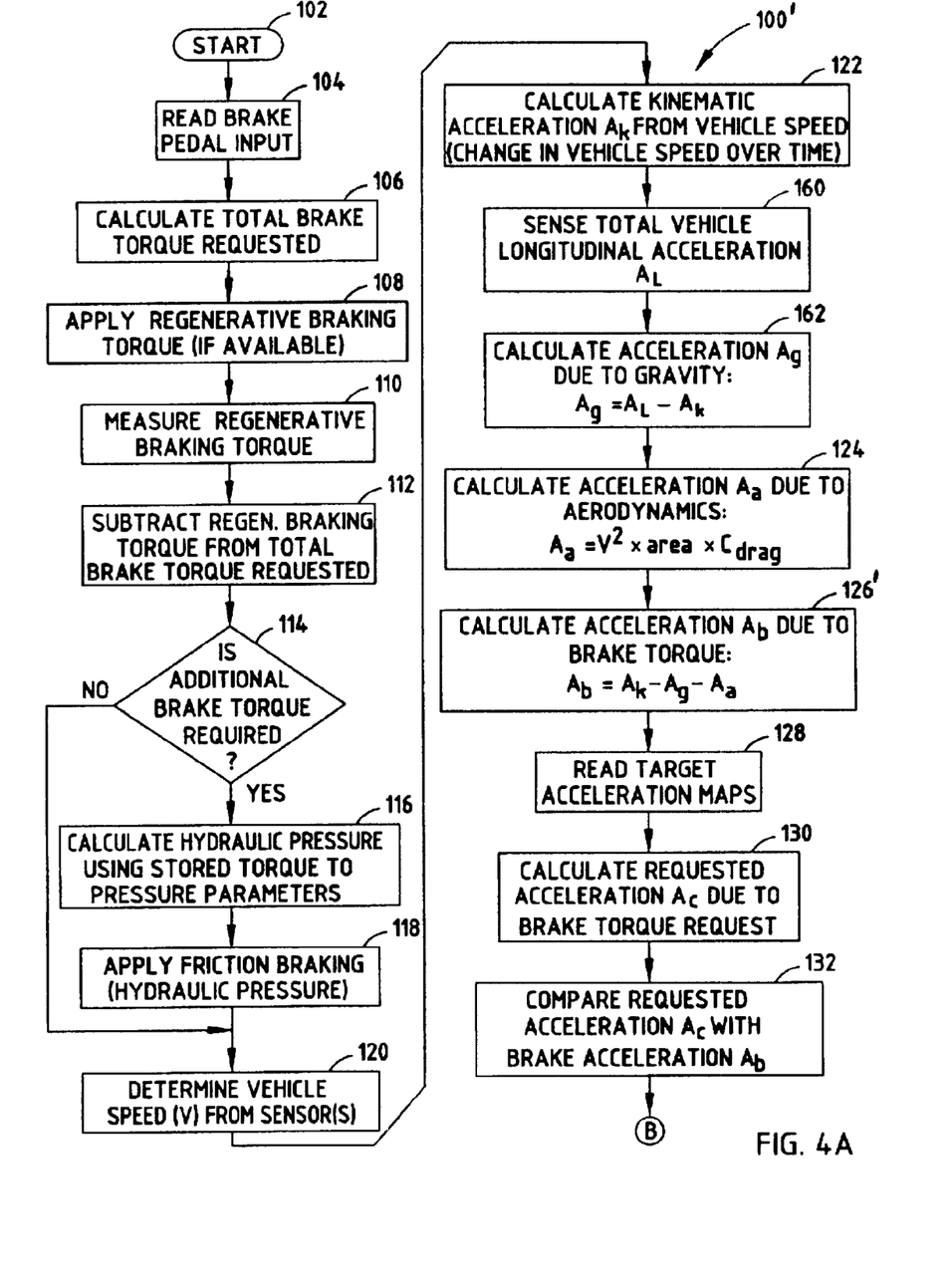
FIGS. 4A–4B is a flow diagram illustrating a method of adaptively controlling braking in a friction and regenerative brake system, according to another embodiment of the present invention.
Figure 4B:
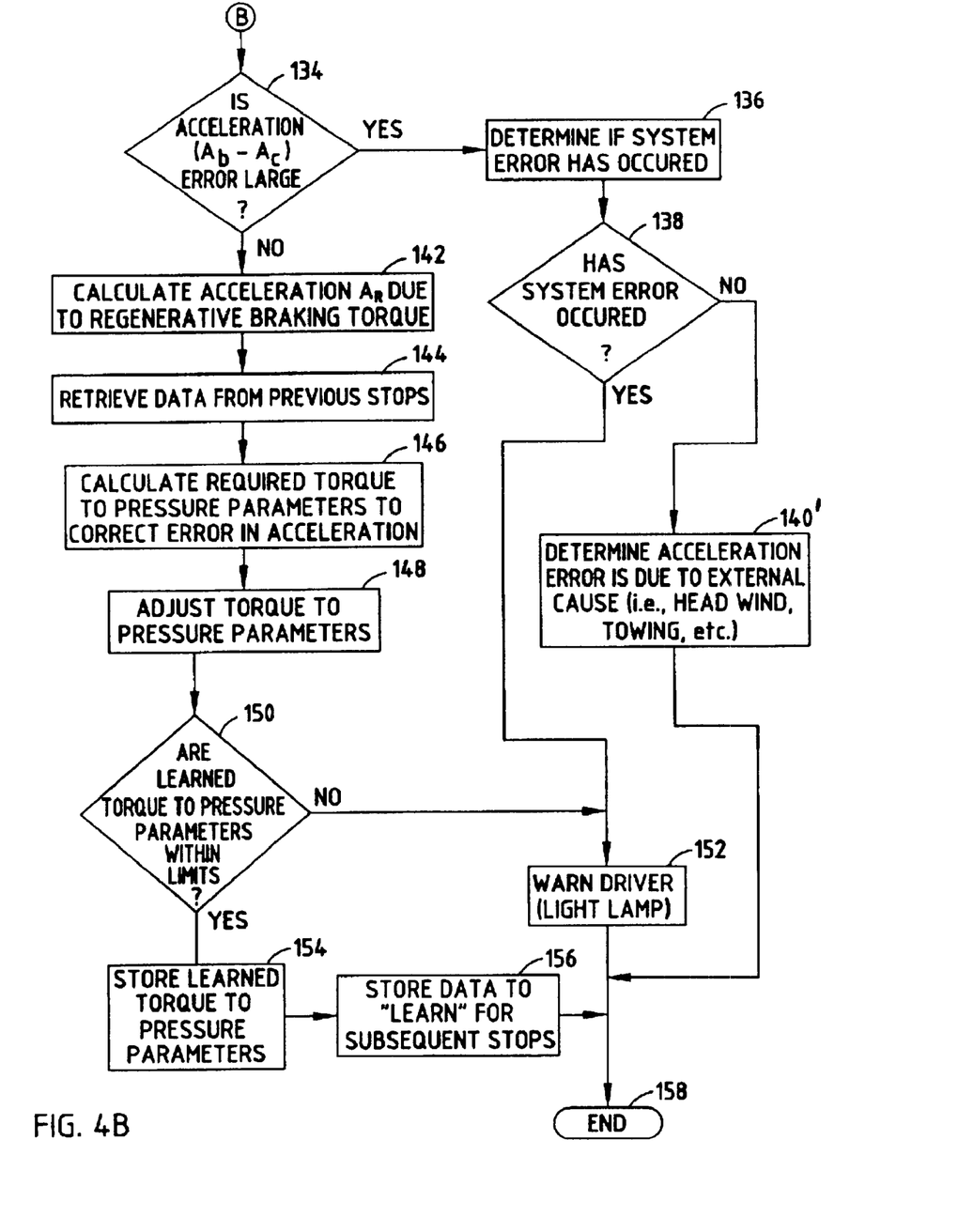

Referring to FIGS. 4A–4B, a brake control methodology 100' is shown for detecting brake torque variation and compensating for such variation for a vehicle equipped with both friction braking and regenerative braking, according to another embodiment of the present invention. Brake control methodology 100' includes various steps described above in connection with the embodiment of brake control methodology 100 shown in FIGS. 3A–3B and, thus, identical steps are labeled with identical reference numerals and are not described herein. In addition to the steps described above, brake control methodology 100' includes step 160 of sensing total vehicle longitudinal acceleration $A_L$ by employing the longitudinal accelerometer to measure acceleration of the vehicle along the longitudinal (i.e., rear-to-front) axis. The brake control methodology 100' further includes step 162 of calculating acceleration $A_g$ due to gravity. Acceleration $A_g$ due to gravity may be calculated as a function of the difference between the calculated kinetic acceleration $A_k$ subtracted from the measured longitudinal acceleration $A_L$. Methodology 100' further varies in that step 126' calculates acceleration $A_b$ due to brake torque by subtracting the acceleration $A_g$ due to gravity and aerodynamic induced acceleration $A_a$ from the kinematic acceleration $A_k$. Accordingly, the brake torque acceleration $A_b$ is further determined as a function of the acceleration $A_g$ due to gravity, thus providing a more accurate estimation of the brake torque acceleration.

As a consequence of factoring in gravitation induced acceleration, brake control methodology 100' does not include grade as a determination of acceleration error due to external cause in step 140'. Accordingly, brake control methodology 100' provides an enhanced accuracy brake torque control system which operates similar to the brake control methodology 100 described above. While aerodynamic induced acceleration and gravitational induced acceleration have been described herein in connection with estimating the total brake torque acceleration, it should be appreciated that other factors may be considered to provide an indication of the brake torque acceleration, without departing from the teachings of the present invention.

Accordingly, the brake system 10 and brake control methodologies 30, 100, and 100' of the present invention advantageously determines brake torque variation in a vehicle and compensate for such brake torque variation to provide a more consistent brake pedal feel for the vehicle operator. The brake torque variation compensation may be applied to a friction braking system to provide for enhanced braking feel consistent from one vehicle to another vehicle. The compensation of brake torque. variation in vehicles employing both regenerative braking and friction braking . provides a consistent brake feel during different braking operations on a vehicle.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A vehicle brake system comprising:
   a brake demand input;
   a friction brake actuator for generating friction braking to be applied to one or more brakes on a vehicle;
   a sensor for determining kinematic acceleration of the vehicle;
   a database storing target accelerations as a function of the brake demand input and storing a brake related parameter that defines a relationship between the brake demand input and the friction braking; and
   a controller for controlling the friction brake actuator based on the brake demand input and the brake related parameter, said controller determining brake acceleration caused by the braking as a function of the sensed kinematic acceleration and determining a target acceleration from the database based on the brake demand input, said controller determining a brake acceleration error as the difference between the target acceleration and the brake acceleration, said controller further adjusting the brake related parameter to reduce the brake acceleration error by adjusting the braking generated by the friction brake actuator to compensate for brake feel variation.

2. The brake system as defined in claim 1, wherein said sensor comprises a wheel speed sensor for sensing the vehicle wheel speed, wherein the controller calculates the kinematic acceleration of the vehicle as a function of the sensed wheel speed.

3. The brake system as defined in claim 1, wherein the controller further calculates an expected aerodynamic induced acceleration, said controller estimating the brake acceleration as a function of the expected aerodynamic induced acceleration.

4. The brake system as defined in claim 1, wherein said controller determines braking torque based on the brake demand input and calculates an amount of pressure to achieve friction braking based on the brake related parameter.

5. The brake system as defined in claim 4, wherein the brake related parameter comprises a torque to pressure parameter.

6. The brake system as defined in claim 1, wherein the brake related parameter is adjusted by a percentage of the brake acceleration error.

7. The brake system as defined in claim 1, wherein the brake related parameter is adjusted based on stored data from previous braking events.

8. The brake system as defined in claim 1 further comprising a regenerative brake actuator for providing regenerative braking of the vehicle, wherein the controller controls a proportional amount of friction braking and regenerative braking, and wherein the controller further retrieves brake data stored during previous vehicle braking events, and the brake related parameter is adjusted as a function of the stored data from previous vehicle braking events.

9. A vehicle brake system comprising:
   a brake demand input;
   a sensor for determining kinematic acceleration of a vehicle;
   a frictional brake actuator for generating friction braking to be applied to one or more brakes on the vehicle;
   a regenerative brake actuator for providing regenerative braking of the vehicle;
   a database storing target accelerations as a function of the brake demand input, a brake related parameter that defines a relationship between the brake demand input and the friction braking, and brake data from previous vehicle braking events; and
   a controller for controlling the friction brake actuator and regenerative brake actuator, said controller determining a brake acceleration caused by the friction braking as a function of the kinematic acceleration and determining a target acceleration from the database based on the brake demand input, said controller further determining a brake acceleration error as a difference between the target acceleration and the brake acceleration, said controller further adjusting the brake related parameter to reduce the brake acceleration error by adjusting the braking generated by the friction brake actuator to compensate for brake feel variation.

10. The brake system as defined in claim 9, wherein the brake related parameter comprises a torque to pressure parameter.

11. The brake system as defined in claim 9, wherein the brake related parameter is adjusted by a percentage of the brake acceleration error.

12. The brake system as defined in claim 9, wherein the brake related parameter is adjusted based on stored data from previous braking events.

13. The brake system as defined in claim 9, wherein said sensor comprises a wheel speed sensor for sensing vehicle speed, wherein the controller calculates the kinematic acceleration of the vehicle as a function of the sensed wheel speed.

14. The brake system as defined in claim 9, wherein the controller further calculates an expected aerodynamic induced acceleration, said controller estimating the brake acceleration as a function of the expected aerodynamic induced acceleration and the sensed kinematic acceleration.

15. The brake system as defined in claim 9 further comprising a longitudinal acceleration sensor for sensing longitudinal acceleration of the vehicle, wherein the controller determines vehicle acceleration due to gravity as a function of the sensed longitudinal acceleration and sensed kinematic acceleration, and wherein said controller estimates the brake acceleration further as a function of the gravitational acceleration.

16. A method of controlling a brake system to compensate for brake feel variation, said method comprising the steps of:
   receiving a brake demand input signal indicative of braking demand requested by an operator of a vehicle;
   determining kinematic acceleration of the vehicle;
   determining brake acceleration caused by the braking as a function of the kinematic acceleration;
   determining a target acceleration from stored data based on the brake demand input;
   determining a brake acceleration error as the difference between the target acceleration and the brake acceleration;
   generating braking to be applied to one or more friction brakes on the vehicle as a function of a brake related parameter, wherein the brake related parameter defines a relationship between the brake demand input and the friction braking; and
   adjusting the brake related parameter to reduce the brake acceleration error by adjusting the braking generated by the friction brake actuator so as to compensate for brake feel variation.

17. The method as defined in claim 16, wherein the step of sensing kinematic acceleration comprises sensing vehicle wheel speed and calculating the kinematic acceleration as a function of the sensed wheel speed.

18. The method as defined in claim 16 further comprising the step of calculating an expected aerodynamic induced acceleration and estimating the brake acceleration as a function of the expected aerodynamic induced acceleration.

19. The method as defined in claim 16, wherein the brake related parameter comprises a torque to pressure parameter, and wherein the pressure determines the amount of friction braking achieved with the friction brake actuator.

20. The method as defined in claim 16 further comprising the steps of:
generating regenerative braking of the vehicle;
storing data from previous vehicle braking events; and
adjusting the brake related parameter as a function of the stored data from the previous vehicle braking events.

* * * * *